Patented July 11, 1944

2,353,434

UNITED STATES PATENT OFFICE 2,353,434

PREPARATION OF DICYANOSTILBENES

Harry James Barber, Gidea Park, Romford, England, assignor to May & Baker Limited, Dagenham, Essex, England, a British company No Drawing. Application September 11, 1941, Serial No. 410,446. In Great Britain September 25, 1940

8 Claims. (Cl. 260—465)

The present invention is for improvements in or relating to the production of dicyanostilbenes which are of value as starting materials for the preparation of the therapeutically valuable diamidinostilbenes described in U. S. Patent No. 2,204,983.

The objects of my invention are to provide new and advantageous methods for the production of dicyanostilbenes and to provide an improved manufacture of tetrabromo - diphenylethanes which can be employed as starting material in the said methods.

I have found that dicyanostilbenes can be prepared by reacting 4,4'-α,β-tetrabromo-diphenylethane or 2,4'-α,β-tetrabromo - diphenylethane with a cuprous salt to produce the corresponding 4,4'- or 2,4'-dibromo-stilbene and treating that product with cuprous cyanide.

As the said cuprous salt I prefer to employ cuprous chloride, bromide or cyanide in a suitable solvent, for example pyridine or quinoline. When a cuprous salt other than cuprous cyanide is employed, an excess of the salt over the amount required for formation of dibromo-stilbene is immaterial but in the case of cuprous cyanide two molecules alone are required since any excess over this amount leads to partial or complete conversion of the dibromo-stilbene to the corresponding dicyano compound.

When the cuprous salt employed is cuprous cyanide, the two process steps may, with advantage, be combined, i. e., by using the cuprous cyanide in an excess over that amount required to produce the dibromo-stilbene such that the two remaining bromine atoms are converted into organic cyano groups with the production of the required dicyano-stilbene. The reaction, which is surprising, proceeds smoothly and gives an almost quantitative yield of the required dicyanostilbene. The exact mechanism of the reaction is unknown to me but the excess cyanide not required for the two organic cyano groups is probably eliminated partly as cyanogen or cyanogen bromide with the copper remaining as cupric bromide or cupric bromocyanide.

In this modification, it may be desirable to employ the cuprous cyanide in an excess over that amount required for the complete conversion of the tetra-bromo-diphenylethane into the dicyano-stilbene, i. e., in excess of four molecules per molecule of the tetrabromo compound.

The 4,4'-α,β- or 2,4'-α,β-tetra-bromo-diphenylethane employed as starting material is preferably prepared by the tetra-bromination of α,β-diphenylethane in acetic acid, the unexpected discovery having been made that, whereas bromination of α,β-diphenylethane in solvents such as chloroform, carbon disulphide, carbon tetrachloride yields only α,β-dibromodiphenylethane, bromination in acetic acid gives 4,4'-α,β-dibromodiphenylethane together with the 2,4'-α,β-isomer, which isomers are readily separated.

The following examples illustrate the method of carrying out the process in practice, but it is to be understood that the invention is in no way limited to the details given in these examples.

Example 1

300 gms. of α-β-diphenylethane were dissolved in 3300 cc. of glacial acetic acid by warming slightly and then cooling. 160 cc. of water were added followed by 400 cc. (1200 gms.) of bromine rapidly with shaking. The mixture was then heated to boiling and maintained in gentle ebullition for 2–3 hours. The tetrabromo compound which settled as a very heavy crystalline solid was isolated by pouring or siphoning off the hot supernatant liquor. After washing with a little hot acetic acid, it was obtained pure. It was identical with the substance described by Wislicenus, (Ber. 41. 4130) from bromine and 4,4'-dibromostilbene. On cooling the acetic acid solution 2,4'-α,β-tetrabromo-diphenylethane separated. M. Pt. 165–170° C. with decomposition.

Example 2

125 gms. of 4,4'-α,β-tetrabromodiphenylethane prepared as described in Example 1 were mixed with 63 gms. of cuprous chloride and 250 cc. of pyridine. The mass was mixed thoroughly and boiled for 1–2 hours under reflux. The mass was then poured with stirring into 1000 cc. of hydrochloric acid S. G. 1.16 and the 4,4'-dibromostilbene filtered off from the hot mixture. It can be purified by crystallisation or it may be used directly for the preparation of dicyanostilbene as described in Example 5. Similarly 2,4'-α-β-tetrabromodiphenylethane gave 2:4'-dibromostilbene. B. Pt. 185–195° C./2 mm. M. Pt. 84–85° C.

Example 3

200 gms. of 4,4'-α,β-tetrabromo-diphenylethane, 224 gms. of cuprous cyanide and 225 cc. of pyridine were mixed thoroughly and heated in a metal bath at 200–210° C. for 1½ hours. Frothing occurs and the temperature of the mixture remained at about 190° C. As frothing diminished the temperature fell slightly. The contents of the flask were cooled slightly and 480 cc. of pyridine were added and the whole boiled for 5 minutes before stirring with 1200 cc. of hydrochloric acid S. G. 1.16 at 50° C. The 4,4'-dicyano-stilbene was collected by filtering the hot acid liquor. It may be purified readily by crystallisation from nitro-benzene or other suitable solvents and is then identical with the product obtained by known methods. 2,4'-dicyano-stilbene, M. Pt. 136° C. may be obtained similarly from 2,4'-α-β-tetrabromodiphenylethane.

*Example 4*

100 gms. of 4,4'-α-β-tetrabromodiphenylethane were mixed thoroughly with 36 gms. of cuprous cyanide and 300 cc. of pyridine and warmed gradually to boiling. A vigorous reaction set in and, when it had moderated, it was completed by boiling under reflux for 1½ hours. The 4,4'-dibromostilbene can be isolated by any convenient process such as is described in Example 3.

*Example 5*

4,4'-dibromostilbene, 60 gms. of cuprous cyanide and 65 gms. of pyridine were heated to 190–200° C. for 1 hour. The melt was then stirred into warm hydrochloric acid S. G. 1.16 and the crude 4,4'-dicyanostilbene washed with hydrochloric acid to free from copper salts. It can be purified as described in Example 2.

In this specification the molecular formula of cuprous cyanide is understood to be CuCN.

I claim:

1. Process for the production of a member of the group consisting of 4:4'-dicyano-stilbene and 2,4'-dicyano-stilbene comprising reacting the corresponding member of the group consisting of 4:4'-α,β-tetrabromo-diphenylethane and 2,4'-α,β-tetrabromo-diphenylethane with a cuprous salt, whereby the corresponding dibromo-stilbene is formed, reacting the latter with cuprous cyanide, and separating the resulting dicyano-stilbene from the reaction product.

2. Process for the production of a member of the group consisting of 4:4'-dicyano-stilbene and 2,4'-dicyano-stilbene comprising reacting the corresponding member of the group consisting of 4:4'-α,β-tetrabromo-diphenylethane and 2,4'-α,β-tetrabromo-diphenylethane with a cuprous salt selected from the class consisting of cuprous chloride, cuprous bromide and cuprous cyanide, whereby the corresponding dibromo-stilbene is formed, reacting the latter with cuprous cyanide, and separating the resulting dicyano-stilbene from the reaction product.

3. Process for the production of a member of the group consisting of 4:4'-dicyano-stilbene and 2,4'-dicyano-stilbene comprising reacting the corresponding member of the group consisting of 4:4'-α,β-tetrabromo-diphenylethane and 2,4'-α,β-tetrabromo-diphenylethane with cuprous cyanide in the proportion of four mols per mol of the said member, and separating the resulting dicyano-stilbene from the reaction product.

4. Process for the production of a member of the group consisting of 4:4'-dicyano-stilbene and 2,4'-dicyano-stilbene comprising reacting one mol equivalent of the corresponding member of the group consisting of 4:4'-α,β-tetrabromo-diphenylethane and 2,4'-α,β-tetrabromo-diphenylethane with two mol equivalents of cuprous cyanide, reacting the product with a further two mol equivalents of cuprous cyanide, and separating the resulting dicyano-stilbene from the reaction product.

5. Process for the production of a member of the group consisting of 4:4'-dicyano-stilbene and 2,4'-dicyano-stilbene comprising reacting the corresponding member of the group consisting of 4:4'-α,β-tetrabromo-diphenylethane and 2,4'-α,β-tetrabromo-diphenylethane with cuprous cyanide in excess of four mol equivalents per mol equivalent of the corresponding member, and separating the resulting dicyano-stilbene from the reaction product.

6. Process for the production of a member of the group consisting of 4:4'-dicyano-stilbene and 2,4'-dicyano-stilbene comprising reacting the corresponding member of the group consisting of 4:4'-α,β-tetrabromo-diphenylethane and 2,4'-α,β-tetrabromo-diphenylethane with a cuprous salt selected from the class consisting of cuprous chloride, cuprous bromide and cuprous cyanide, the said cuprous salt being employed as a solution in an organic solvent selected from the group consisting of pyridine and quinoline, whereby the corresponding dibromo-stilbene is formed, reacting the latter with cuprous cyanide, and separating the resulting dicyano-stilbene from the reaction product.

7. Process for the production of a member of the group consisting of 4:4'-dicyano-stilbene and 2,4'-dicyano-stilbene comprising reacting the corresponding member of the group consisting of 4:4'-α,β-tetrabromo-diphenylethane and 2,4'-α,β-tetrabromo-diphenylethane with a cuprous cyanide in the proportion of four mols per mol of the said member, the cuprous cyanide being employed in the form of a solution in an organic solvent selected from the group consisting of pyridine and quinoline, and separating the resulting dicyano-stilbene from the reaction product.

8. In a process for the production of dicyano-stilbenes from a member of the group consisting of 4,4'-α,β-tetrabromo-diphenylethane and 2,4'-α,β-tetrabromo-diphenylethane, the step comprising the reduction of the said member with a two mol equivalent of a cuprous salt, whereby the corresponding di-bromo-stilbene is formed as an intermediate.

HARRY JAMES BARBER.